June 12, 1928.
W. A. GEIGER
1,673,044
FRICTION SHOCK ABSORBING MECHANISM
Filed March 9, 1925
2 Sheets-Sheet 1
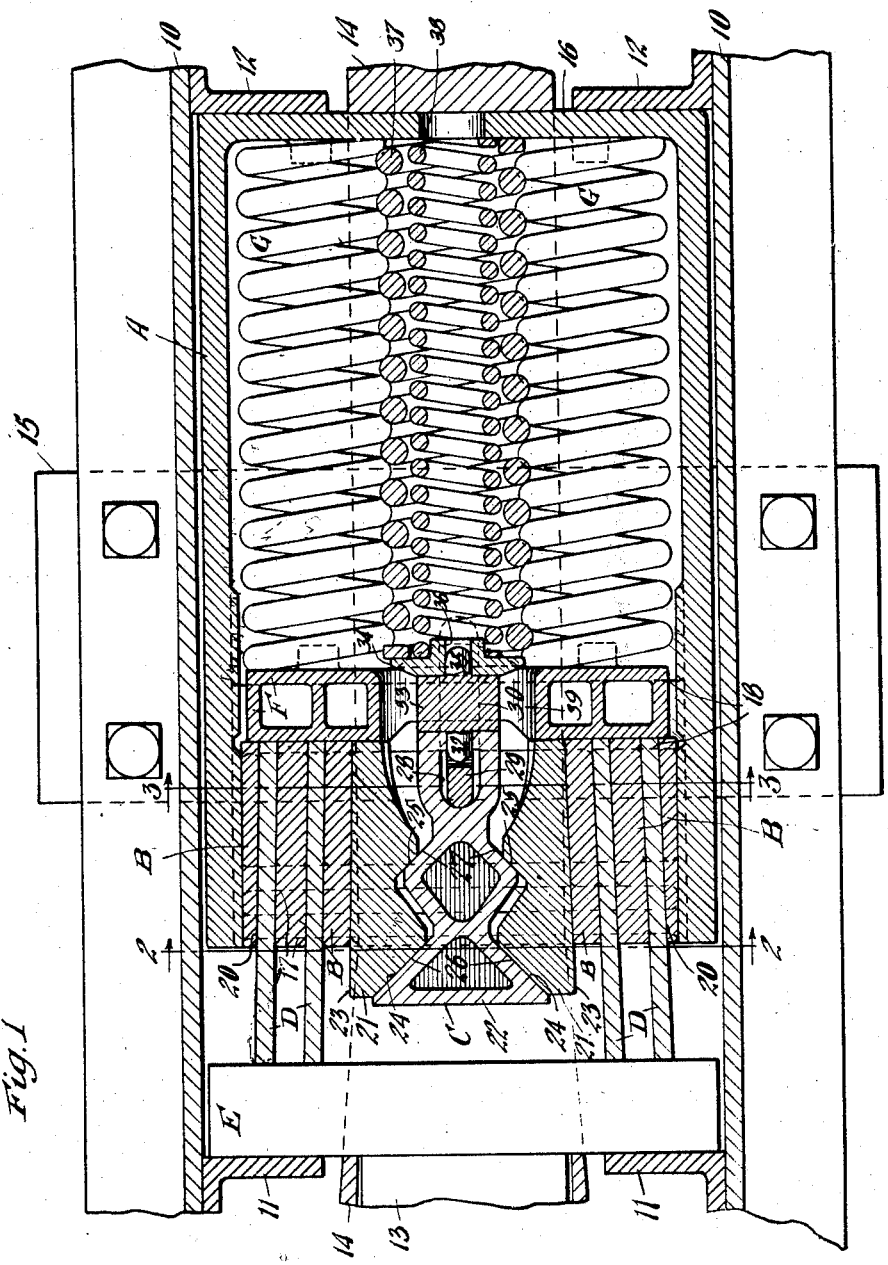

June 12, 1928.  
W. A. GEIGER  
1,673,044  
FRICTION SHOCK ABSORBING MECHANISM  
Filed March 9, 1925  
2 Sheets-Sheet 2
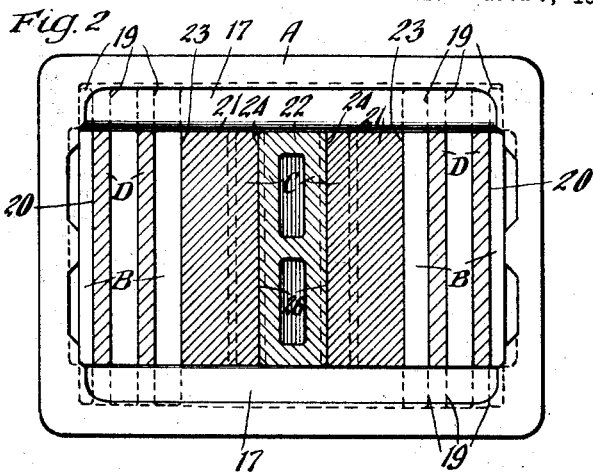
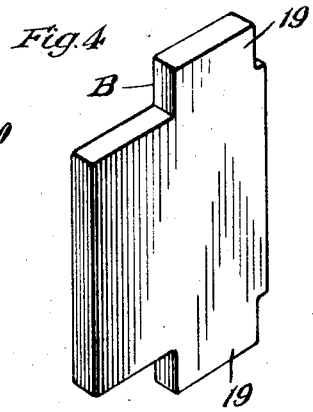
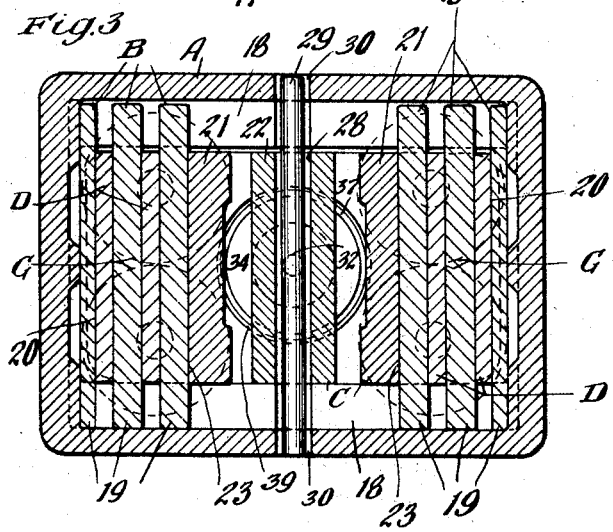
Witness  
Hans M. Rachlitz
Inventor  
William A. Geiger  
By George D. Haight  
His Atty.

Patented June 12, 1928.

1,673,044

UNITED STATES PATENT OFFICE.

WILLIAM A. GEIGER, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed March 9, 1925. Serial No. 13,983.

This invention relates to improvements in friction shock absorbing mechanisms.

One object of the invention is to provide a high capacity friction shock absorbing mechanism having preliminary spring action.

Another object of the invention is to provide a mechanism of the character indicated, especially adapted for railway draft riggings, and comprising a main spring resistance, a plurality of relatively stationary friction plates anchored against longitudinal movement but responsive to laterally applied pressure, and wedge-acting means frictionally co-operative with said plates, in conjunction with pressure-transmitting elements extending beyond said wedge-acting means and arranged to afford a spring resistance during a predetermined preliminary portion of the compression stroke, said compression elements being interposed between certain of the friction plates, and during the final portion of the compression stroke of the gear having frictional coaction with said plates.

Other objects and advantages of the invention will more fully and clearly appear from the description and claims hereinafter following.

In the drawings forming a part of this specification, Figure 1 is a longitudinal, horizontal, sectional view of a portion of a railway draft rigging showing my improvements in connection therewith. Figure 2 is a vertical, transverse, sectional view, corresponding substantially to the line 2—2 of Figure 1. Figure 3 is a vertical, transverse, sectional view, corresponding substantially to the line 3—3 of Figure 1. And Figure 4 is a detailed, perspective view of one of the friction plates employed in connection with my improved mechanism.

In said drawings 10—10 denote the usual channel-shaped center or draft sills of a railway car underframe, to the inner faces of which are secured front stop lugs 11—11, and rear stop lugs 12—12 of usual construction. A portion of the drawbar is shown at 13, the same having operatively connected thereto a hooded yoke 14 of well-known form, and within which is disposed a shock absorbing mechanism proper, hereinafter described in detail. The yoke and parts contained therewithin are supported in operative position by a detachable saddle plate 15.

The improved shock absorbing mechanism, as shown, comprises, broadly, a spring cage A; friction plates B; wedge means C, power-transmitting elements D; a front follower E, a spring follower F and a main spring resistance G.

The spring cage A is preferably rectangular in cross-section, and provided with a transverse rear wall 16 adapted to co-operate with the rear stop lugs 12 in the manner of the usual rear follower. The interior of the forward end of the spring cage A is provided with upper and lower inwardly projecting transverse ribs 17—17, and spaced rearwardly from the ribs 17—17 a suitable distance are similar transversely disposed ribs 18—18.

The friction plates B are preferably six in number, and disposed three on each side of the central wedge acting means C, with the transmitting elements D interposed alternately between such plates, in a manner hereinafter more fully referred to. Each of the plates B is provided with projections 19 which are disposed between the inner and outer transverse ribs 17—17 and 18—18, whereby the plates B are held relatively stationary against movement longitudinally of the gear, but are responsive to laterally applied pressure. The outermost plates B have their inner surfaces diverging outwardly as indicated at 20 in Figure 1, which affords an increased wedging action of the center wedge-acting means C.

The wedge acting means C comprises wedge-friction shoes 21 disposed upon opposite sides of the wedge proper, as indicated at 22. The blocks 21 have flat outer surfaces 23 adapted to frictionally co-act with the adjacent friction plates B. The inner longitudinal faces of the blocks 21 are provided with outer wedge surfaces 24, and spaced inner wedge surfaces 25, adapted to co-act with wedge surfaces 26 and 27 respectively of the center wedge 22 and to have certain relation thereto, the wedge 22 and the blocks 21 being of a character to move freely longitudinally with reference to the mechanism and to the transversely disposed ribs 17—17 and 18—18, and to bear against the mainspring resistance G. The rear portion of the wedge 22 is provided with a vertically disposed opening 28, through which extends a retaining pin 29, such pin being capable of longitudinal movement in the slots 30—30 in the top and bottom walls of the spring cage A. The retaining pin 29 is provided with a centrally disposed notch in its rear edge adapted for the reception of a projection 32, formed upon a spacing block 33, which is interposed between the rear end of the wedge 22, and the forward portion of a small annular spring follower 34, the block 33 being provided with a projection 35 adapted to fit within an opening 36 formed in the spring follower 34. Bearing against the inner surface of the spring follower 34 are the coil springs 37 and 38, the rear ends of such springs resting against the rear wall 16 of the spring cage, the arrangement being such that the wedge 22 and the wedge blocks 21—21 are normally held in projected position independently of the main spring resistance G, and the forward movement of the wedge 22 is limited by the retainer pin 29.

The power transmitting elements D, are preferably four in number, and are interposed between the friction plates B on each side of the mechanism so that they form in effect, friction plates, said elements D being of a width as to freely slide longitudinally with reference to the transversely disposed ribs 17—17 and 18—18. The inner ends of the power transmitting elements D bear upon the spring follower F, and the forward ends of the elements D project a suitable predetermined distance beyond the wedge-acting means C, and bear against the inner surface of the front follower E.

The spring follower F is of hollow construction and is provided with a centrally disposed aperture 39 of such size that the spring follower F may move inwardly without interference with the spring follower 34, or the springs 37 and 38, the inward movement of the spring follower F, of course, being opposed by the main spring resistance G.

Assuming a buffing or compression action applied to the mechanism, the operation is as follows. As the front follower E is moved inwardly, the movement thereof is transferred directly to the spring follower F by the power-transmitting elements D without movement of the wedge-acting means C, the friction plates B being relatively loose during this portion of the action, for the reason that the wedge acting means is normally projected outwardly by the pressure of the springs 37 and 38 thereon, thus affording a preliminary purely spring action of the mechanism. Inasmuch as the friction plates on the opposite sides of the shoes converge inwardly of the mechanism, the shoes will be held in intimate contact with the wedge faces of the block C. The described action will continue until the inner surface of the front follower E comes into contact with the outer end of the wedge 22, which will cause lateral movement of the wedge blocks 21, inward movement of the shoes being resisted due to the converging relation of the friction surfaces of the co-acting plates. This results in lateral pressure being applied to the friction plates B and to the power-transmitting elements D, the wedge-acting means moving relatively to the adjacent friction plates B, and the power-transmitting elements D moving relatively to the related friction plates B, thereby setting up a powerful frictional resistance to the parts in addition to the resistance exerted by the main spring resistance G, and it will be noted that the follower F during the preliminary movement of the gear may move inwardly without interference with the central wedge, or the central wedge springs 37 and 38.

Upon removal of the actuating force, the initial action will be an outward movement of the wedge 22, and then the wedge blocks 21 which will be carried therewith, removing the pressure from the friction plates B, and when such plates are loosened, the power-transmitting elements D are projected into original position through the action of the main spring resistance upon the follower F. The outward movement of the wedge is limited by the retainer pin 29, and the power-transmitting elements D are of such length that the same project a suitable distance beyond the wedge-acting means C, when the spring follower F resumes its original position, so as to be engaged by the follower E prior to the engagement of the wedge-acting means by the follower.

With the arrangement above described, it will be evident that a comparatively light preliminary spring action is obtained, to absorb the lighter more frequent shocks, and a relatively heavy combined frictional and spring resistance is thereafter had to absorb the heavier shocks.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a follower-acting member and a follower; of a plurality of relatively stationary friction plates anchored to said member against longitudinal movement thereof, but responsive to laterally applied pressure; of a main spring resistance; wedge-acting means normally spaced from said follower and adapted to be engaged by said follower after a predetermined compression of the mechanism to apply lateral pressure to said friction plates; and pressure-transmitting elements having friction surfaces co-operating with said plates and extending beyond said wedge acting means in the normal position of the parts and interposed between said follower and said main spring resistance to transmit the actuating force to said spring resistance during the initial compression of the mechanism.

2. In a friction shock absorbing mechanism, the combination with a follower acting member and a follower; of a plurality of relatively stationary friction plates anchored to said member against longitudinal movement thereof, but responsive to laterally applied pressure; a main spring resistance; wedge-acting lateral pressure creating means adapted to be actuated by said follower after a predetermined compression of the mechanism, said means co-operating with the friction plates; and pressure transmitting elements interposed between the said friction plates and movable longitudinally with reference thereto, said pressure transmitting elements normally projecting outwardly beyond the said wedge acting means, said main spring resistance yieldingly opposing movement of said pressure transmitting elements.

3. In a shock absorbing mechanism, the combination with a follower-acting member, and a follower; of a plurality of relatively stationary friction plates anchored to said member against longitudinal movement thereof but responsive to laterally applied pressure; wedge-acting means frictionally co-acting with said friction plates and movable longitudinally relatively thereto; resilient means bearing upon said wedge-acting means and arranged to maintain the same in projected position; a main spring resistance; a spring follower adapted to move relatively to said resilient means without interference therewith; and means for imparting initial action to said spring follower prior to the application of pressure to said wedge-acting means.

4. In a friction shock absorbing mechanism, the combination with a follower acting member and a follower; of a plurality of relatively stationary friction plates anchored to said member against longitudinal movement thereof, but responsive to laterally applied pressure; wedge-acting means adapted to frictionally engage with said friction plates, said wedge-acting means including a central wedge member provided with a plurality of wedge faces, and co-operating wedge-shoes provided with wedge surfaces corresponding to said wedge faces; a main spring resistance bearing against said wedge block; independent resilient means bearing against said wedge; and pressure-transmitting elements extending outwardly beyond said wedge-acting means, and arranged to directly actuate said main spring resistance.

5. In a friction shock absorbing mechanism, the combintion with a follower acting member and a follower; of a plurality of relatively stationary friction plates anchored to said member against longitudinal movement thereof, but responsive to laterally applied pressure; of a main spring resistance; wedge-acting means adapted to be actuated by said follower after preliminary action of the mechanism co-operating with said friction plates, and said spring resistance; means normally maintaining said wedge-acting means in projected position; and means operated by said follower for compressing said main spring resistance during a preliminary action of the mechanism and maintaining said follower out of actuating relation to said wedge acting means during said preliminary action and arranged to further compress said main spring resistance and to frictionally co-act with said wedge-acting means and said friction plates during actuation of said wedge means by said follower.

In witness that I claim the foregoing I have hereunto subscribed my name this 6th day of March 1925.

WILLIAM A. GEIGER.